US006866977B2

(12) United States Patent
Sorriero et al.

(10) Patent No.: US 6,866,977 B2
(45) Date of Patent: Mar. 15, 2005

(54) PHOTOCONDUCTIVE ELEMENTS HAVING A POLYMERIC BARRIER LAYER

(75) Inventors: Louis J. Sorriero, Rochester, NY (US); Michel F. Molaire, Rochester, NY (US); Marie B. O'Regan, Santa Barbara, CA (US); Wayne T. Ferrar, Rochester, NY (US); David S. Weiss, Rochester, NY (US); Jane Robin Cowdery, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/243,702

(22) Filed: Sep. 14, 2002

(65) Prior Publication Data

US 2003/0162109 A1 Aug. 28, 2003

Related U.S. Application Data

(63) Continuation-in-part of application No. 09/954,907, filed on Sep. 18, 2001, now Pat. No. 6,593,046, which is a continuation-in-part of application No. 09/574,775, filed on May 19, 2000, now Pat. No. 6,294,301.

(51) Int. Cl.[7] ................................. G03G 5/10
(52) U.S. Cl. ........................... 430/64; 430/96
(58) Field of Search ....................... 430/64, 96

(56) References Cited

U.S. PATENT DOCUMENTS

| 3,428,451 A | 2/1969 | Trevoy et al. |
| 3,658,773 A | 4/1972 | Zecher et al. |
| 3,856,752 A | 12/1974 | Bateman et al. |
| 4,082,551 A | 4/1978 | Steklenski et al. |
| 4,442,193 A | 4/1984 | Chen et al. |
| 4,618,560 A | 10/1986 | Borsenberger et al. |
| 4,668,600 A | 5/1987 | Lingnau et al. |
| 4,687,834 A | 8/1987 | Bartmann et al. |
| 4,830,953 A | 5/1989 | Bateman et al. |
| 4,971,873 A | 11/1990 | Pavlisko et al. |
| 4,992,349 A | 2/1991 | Chen et al. |
| 5,128,226 A | 7/1992 | Hung |
| 5,266,429 A | 11/1993 | Sorriero et al. |
| 5,266,431 A | 11/1993 | Mammino et al. |
| 5,614,342 A | 3/1997 | Molaire et al. |
| 5,641,599 A | 6/1997 | Markovics et al. |
| 5,681,677 A | 10/1997 | Bugner et al. |
| 5,693,442 A | 12/1997 | Weiss et al. |
| 5,733,695 A | 3/1998 | Molaire et al. |
| 5,874,018 A | 2/1999 | Ferrar et al. |
| 5,876,889 A | 3/1999 | Nakamura et al. |
| 6,294,301 B1 | 9/2001 | Sorriero et al. |

FOREIGN PATENT DOCUMENTS

| EP | 0 762 220 A2 A3 | 3/1997 |
| EP | 1 156 371 A1 | 11/2001 |
| GB | 2 073 211 A | 10/1981 |
| JP | 59-176750 | 10/1984 |
| JP | 63132251 | 6/1988 |

OTHER PUBLICATIONS

Sorenson et al., "Preparative Methods of Polymer Chemistry", pps. 113–116 and 62–64, InterScience Publishing, Inc. (1961) N.Y.N.Y.

Phadke, "Quality Engineering Using Robust Design", p131, Prentice Hall (1989).

U.S. Appl. No.: 09/877,763 Filed Jun. 8, 2001.

European Search Report on EP Application No. 02020591.0.

Primary Examiner—John L Goodrow
(74) Attorney, Agent, or Firm—John L. Wood; Roger P. Glass (57) ABSTRACT

Disclosed are photoconductive elements including a conductive support, e.g., an electrically conductive film, drum, or belt, on which a negatively chargeable photoconductive layer is disposed. An electrical barrier layer is disposed between the conductive support and the photoconductive layer. The barrier layer provides a high energy barrier to the injection of positive charges, but transports electrons under an applied electric field. In embodiments, the barrier layer can transport charge by electronic mechanisms, and, is not substantially affected by humidity changes. The barrier layer includes a polyamide-co-imide having covalently bonded as repeat units in the polymer chain, aromatic tetracarbonylbisimide groups of the formula:

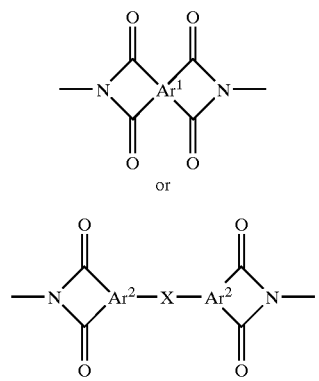

wherein $Ar^1$ and $Ar^2$ respectively represent tetravalent or trivalent aromatic groups of 6 to about 20 carbon atoms, and X is O, $C(CF_3)_2$, S=O or $SO_2$. The amount of aromatic tetracarbonylbisimide content in the polymer is selected such that the barrier layer can be coated onto the support as a relatively thick layer, which provides for enhanced performance as a photoconductor when used in an electrophotographic process.

25 Claims, 5 Drawing Sheets

PHOTOCONDUCTIVE ELEMENTS HAVING A POLYMERIC BARRIER LAYER

CROSS REFERENCE TO RELATED APPLICATIONS

This application claims benefit under 35 U.S.C. §120 and is a continuation-in-part of U.S. Ser. No. 09/954,907, filed Sep. 18, 2001 now U.S. Pat. No. 6,593,046, which is a continuation-in-part of U.S. Ser. No. 09/574,775, filed May 19, 2000, now U.S. Pat. No. 6,294,301. The teachings of the above related applications and patent are incorporated herein by reference in their entirety.

FIELD OF THE INVENTION

This invention relates to electrophotography. More particularly, it relates to polymers comprising a tetracarbonylbisimide group and to photoconductive elements that contain an electrical charge barrier layer comprised of said polymers.

BACKGROUND OF THE INVENTION

Photoconductive elements useful, for example, in electrophotographic copiers and printers are composed of a conducting support having a photoconductive layer that is insulating in the dark but becomes conductive upon exposure to actinic radiation. To form images, the surface of the element is electrostatically and uniformly charged in the dark and then exposed to a pattern of actinic radiation. In areas where the photoconductive layer is irradiated, mobile charge carriers are generated which migrate to the surface and dissipate the surface charge. This leaves in non-irradiated areas a charge pattern known as a latent electrostatic image. The latent image can be developed, either on the surface on which it is formed or on another surface to which it is transferred, by application of a liquid or dry developer containing finely divided charged toner particles.

Photoconductive elements can comprise single or multiple active layers. Those with multiple active layers (also called multi-active elements) have at least one charge-generation layer and at least one n-type or p-type charge-transport layer. Under actinic radiation, the charge-generation layer generates mobile charge carriers and the charge-transport layer facilitates migration of the charge carriers to the surface of the element, where they dissipate the uniform electrostatic charge and form the latent electrostatic image.

Also useful in photoconductive elements are charge barrier layers, which are formed between the conductive layer and the charge generation layer to restrict undesired injection of charge carriers from the conductive layer. Various polymers are known for use in barrier layers of photoconductive elements. For example, Hung, U.S. Pat. No. 5,128,226, discloses a photoconductor element having an n-type charge transport layer and a barrier layer, the latter comprising a particular vinyl copolymer. Steklenski, et al. U.S. Pat. No. 4,082,551, refers to Trevoy U.S. Pat. No. 3,428,451, as disclosing a two-layer system that includes cellulose nitrate as an electrical barrier. Bugner et al. U.S. Pat. No. 5,681,677, discloses photoconductive elements having a barrier layer comprising certain polyester ionomers. Pavlisko et al, U.S. Pat. No. 4,971,873, discloses solvent-soluble polyimides as polymeric binders for photoconductor element layers, including charge transport layers and barrier layers.

The known barrier layer materials have certain drawbacks, especially when used with negatively charged elements having p-type charge transport layers. Thus, a negative surface charge on the photoconductive element requires the barrier material to provide a high-energy barrier to the injection of positive charges (also known as holes) and to transport electrons under an applied electric field. Many known barrier layer materials are not sufficiently resistant to the injection of positive charges from the conductive support of the photoconductive element. Also, for many known barrier materials the mechanism of charge transport is ionic. This property allows for a relatively thick barrier layer for previously known barrier materials, and provides acceptable electrical properties at moderate to high relative humidity (RH) levels. Ambient humidity affects the water content of the barrier material and, hence, its ionic charge transport mechanism. Thus, at low RH levels the ability to transport charge in such materials decreases and negatively impacts film electrical properties. A need exists for charge barrier materials that transport charge by electronic as well as ionic mechanisms so that films are not substantially affected by humidity changes.

Still further, a number of known barrier layer materials function satisfactorily only when coated in thin layers. As a consequence, irregularities in the coating surface, such as bumps or skips, can alter the electric field across the surface. This in turn can cause irregularities in the quality of images produced with the photoconductive element. One such image defect is caused by dielectric breakdowns due to film surface irregularities and/or non-uniform thickness. This defect is observed as toner density in non-image areas, also known as background density.

Photoconductive elements typically are multi-layered structures wherein each layer, when it is coated or otherwise formed on a substrate, needs to have structural integrity and desirably a capacity to resist attack when a subsequent layer is coated on top of it or otherwise formed thereon. Such layers are typically solvent coated using a solution with a desired coating material dissolved or dispersed therein. This method requires that each layer of the element, as such layer is formed, should be capable of resisting attack by the coating solvent employed in the next coating step.

Accordingly, a need exists for a negatively chargeable photoconductive element having a p-type photoconductor, and including an electrical barrier layer that can be coated from an aqueous or organic medium, that has good resistance to the injection of positive charges, can be sufficiently thick that minor surface irregularities do not substantially alter the field strength, and resists hole transport over a wide humidity range. Still further, a need exists for photoconductive elements wherein the barrier layer is substantially impervious to, or insoluble in, solvents used for coating other layers, e.g., charge generation layers, over the barrier layer.

Photoconductive elements comprising a photoconductive layer formed on a conductive support such as a film, belt or drum, with or without other layers such as a barrier layer, are also referred to herein, for brevity, as photoconductors.

SUMMARY OF THE INVENTION

The above objects and advantages can be attained by the present invention, which relates to photoconductive elements comprising an electrically conductive support, an electrical barrier layer and, disposed over the barrier layer, a charge generation layer capable of generating positive charge carriers when exposed to actinic radiation. The electrical barrier layer, which restrains injection of positive charge carriers from the conductive support, comprises a condensation polymer having as a repeating unit a planar, electron-deficient, tetracarbonylbisimide group. Without wishing to be bound by theory, it is believed that such bisimide group can transport charge primarily by electronic rather than ionic transport mechanisms.

In some preferred embodiments, as described hereinafter, the condensation polymer includes an ether repeat unit in the polymer backbone, which unit can impart desirable mechanical and/or electrical properties into the electrical barrier layer.

More specifically, in the photoconductive element of the invention, said barrier layer comprises a condensation polymer having covalently bonded as repeating units in the polymer chain, aromatic tetracarbonylbisimide groups of the formula:

or wherein $Ar^1$ and $Ar^2$ represent, respectively, tetravalent or trivalent aromatic groups of 6 to about 20 carbon atoms and X is O, $C(CF_3)_2$, S=O or $SO_2$.

More specifically, in embodiments, the barrier layer polymer is a polyamide-co-imide that contains an aromatic tetracarbonylbisimide group, and has the formula:

wherein:

Q represents one or more groups selected from:

(a) an alkylenedioxy, alkylenedicarbonyl, aromatic dicarboxyl, aromatic dicarbonyl, and aromatic diamino groups having from about 2 to about 36 carbon atoms;

(b)

(c)

and (d)

and where:

$Ar^3$, $Ar^4$, and $Ar^7$ independently represent a tetravalent aromatic group having from about 6 to about 20 carbon atoms;

$Ar^5$ and $Ar^6$ independently represent a trivalent aromatic group having from about 6 to about 12 carbon atoms;

$R^1$, $R^2$, $R^3$, $R^4$, $R^5$, and $R^6$ independently represent alkylene or alkyleneoxy groups having from about 2 to about 12 carbon atoms;

$L^1$, $L^2$, $L^3$, $L^4$, $L^5$, and $L^6$ independently represent CO or NH;

$Z^1$ and $Z^2$ independently represent an alkylenediacid, alkylenediamino, or alkyleneoxydiamino group having from about 2 to about 36 carbon atoms;

X is O, $C(CF_3)_2$, S=O or $SO_2$; and x and y represent mole fractions, x being the mole fraction of the group that contains $Ar^3$ and y being the mole fraction of the group, $Z^1$; and wherein x is from about 0.1 to about 0.8 and y is from 0 to about 0.95. More preferably, x is from about 0.25 to about 0.75, and even more preferably from about 0.5 to about 0.75.

The barrier layer polymers described above are also preferably substantially insoluble in solvents used for coating the charge generation layer over the electrical barrier layer under the coating conditions employed. The preferred polyamide-co-imides described above can also generally resist both swelling and solubilization during the time frame for the coating step associated with formation of the charge generation layer.

DETAILED DESCRIPTION OF THE INVENTION

Figure 1:
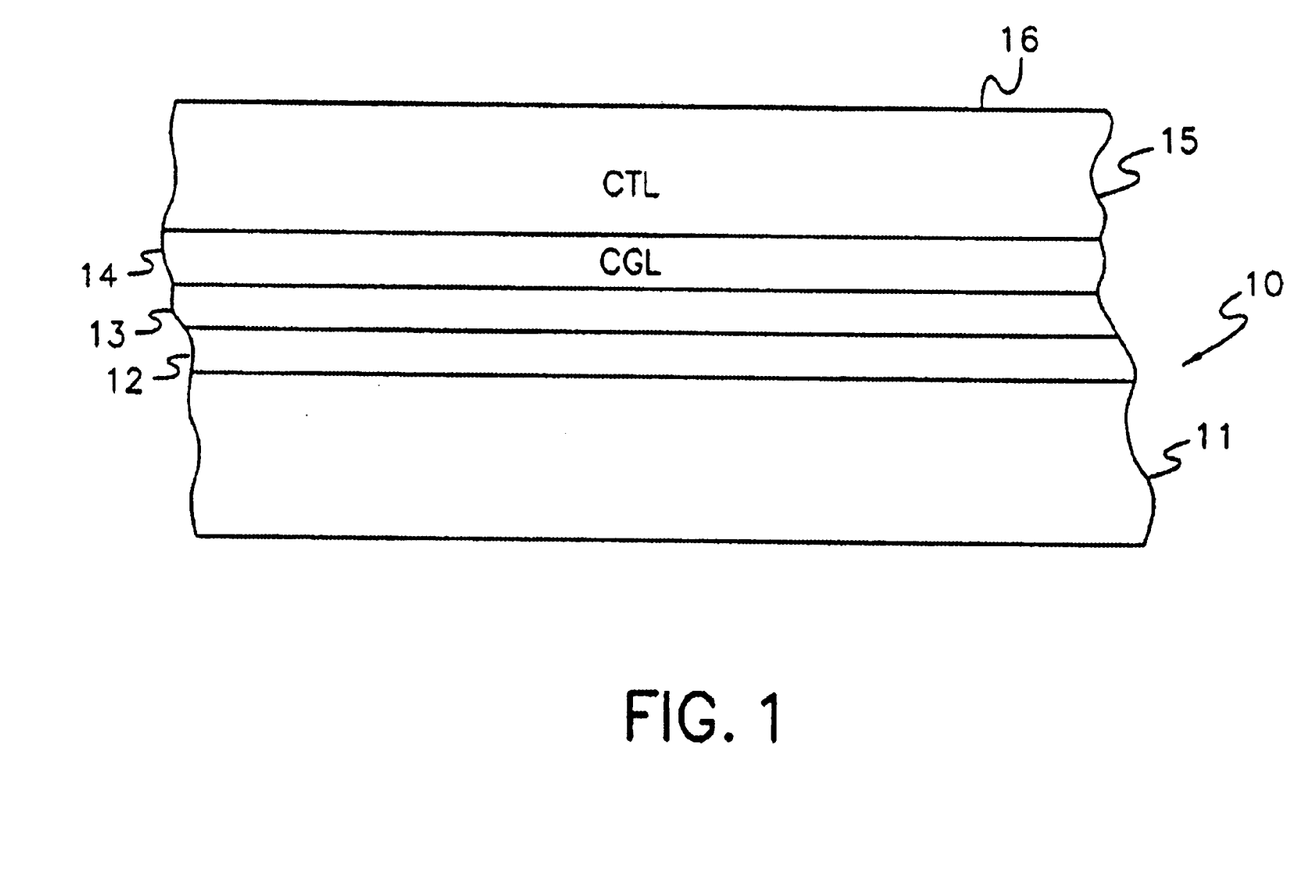
FIG. 1 is a schematic cross section, not to scale, for one embodiment of a photoconductive element according to the invention.

As illustrated in FIG. 1, an embodiment of a photoconductive element 10 of the invention comprises a flexible polymeric film support 11. On this support is coated an electrically conductive layer 12. Over the conductive layer 12 is coated a polymeric barrier layer 13, the composition of which is indicated above and described more fully hereinafter. Over the barrier layer 13 is coated a charge generation layer 14, and over the latter is coated a p-type charge transport layer 15. The p-type charge transport layer 15 is capable of transporting positive charge carriers generated by charge generation layer 14 in order to dissipate negative charges on the surface 16 of the photoconductive element 10.

The barrier and other layers of the photoconductive element are coated on an "electrically-conductive support," by which is meant either a support material that is electrically-conductive itself or a support material comprising a non-conductive substrate, such as support 11 of the drawing, on which is coated a conductive layer 12, such as vacuum deposited or electroplated metals, such as nickel. The support can be fabricated in any suitable configuration, for example, as a sheet, a drum, or an endless belt. Examples of "electrically-conductive supports" are described in Bugner et al, U.S. Pat. No. 5,681,677, the teachings of which are incorporated herein by reference in their entirety.

The barrier layer composition can be applied to the electrically conductive substrate by coating the substrate with an aqueous dispersion or solution of the barrier layer polymer using, for example, well known coating techniques, such as knife coating, spray coating, swirl coating, extrusion hopper coating, or the like. In addition to water, other solvents which are suitable are polar solvents, such as alcohols, like methanol, ethanol, propanol, iso-propanol, and mixtures thereof. As indicated in the examples hereinafter, such polar solvents can also include ketones, such as acetone, methylethylketone, methylisobutylketone, or mixtures thereof. After application to the conductive support, the so-coated substrate can be air dried. It should be understood, however, that, if desired, the barrier layer polymers can be coated as solutions or dispersions in organic solvents, or mixtures of such organic solvents and water, by solution coating techniques known in the art.

Typical solvents for solvent coating a photoconductive charge generation layer over a charge barrier layer are disclosed, for example, in Bugner et al., U.S. Pat. No. 5,681,677; Molaire et al., U.S. Pat. No. 5,733,695; and Molaire et al., U.S. Pat. No. 5,614,342, the teachings of which are all incorporated herein by reference in their entirety. As these references indicate, the photoconductive material, e.g., a photoconductive pigment, is solvent coated by dispersing it in a binder polymer solution. Commonly used solvents for this purpose include chlorinated hydrocarbons, such as dichloromethane, as well as ketones and tetrahydrofuran. A problem with known barrier layer compositions is that such solvents for the coating of the photoconductive or charge generation layer will also dissolve or damage the barrier layer. An advantage of the barrier layer compositions of the invention, especially those comprising a polyamide-co-imide, is that they are not substantially dissolved or damaged by chlorinated hydrocarbons or the other commonly used solvents for coating photoconductor or charge generation layers, at the temperatures and for the time periods employed for coating such layers.

Certain of the barrier layer polymers of the invention can be dissolved in mixtures of dichloromethane with a polar solvent such as methanol or ethanol, as will be seen from working examples hereinafter. However, the barrier layer polymers of the invention, especially the polyamide-co-imide species, do not dissolve substantially in chlorinated hydrocarbons, e.g., dichloromethane or in ketones such as dialkylketones or in tetrahydrofuran. By "substantially insoluble", it is meant dissolving to the extent of less than 0.1 mg/100 ml of solvent at 25° C. over a period of 5 minutes.

Another advantage of the polymers employed in barrier layers in accordance with the invention is that in addition to their other advantages they can be made from more readily available starting materials than can the polyimides of Pavlisko et al., U.S. Pat. No. 4,971,873 and that the starting materials can be selected to yield a polymer that is either substantially insoluble or soluble in particular solvents.

The preferred embodiments of the present invention further comprise multi-active photoconductive elements having separate charge generation layers and charge transport layers; such elements provide superior photographic speed and benefit the most from the use of a barrier layer to restrain migration of positive charge carriers from the conductive support. However, it should be understood that the invention also includes single layer photoconductive elements having a barrier layer between the conductive support and the photoconductive layer. Even with such single layer elements, injection of positive charges from the conductive support is a problem. Hence, the inclusion of a barrier layer in accordance with the invention provides a valuable improvement.

The compositions of, the locations, and methods for forming the photoconductive charge generating layer, the charge transport layer, and other components of the photoconductive element of the invention can be as described in Bugner et al. U.S. Pat. No. 5,681,677 cited above and incorporated herein by reference in its entirety.

A preferred conductive support for use in electrophotographic and laser copiers or printers is a seamless, flexible cylinder or belt of polymer material on which nickel can be electroplated or vacuum deposited. Other useful supports include belts or cylinders with layers of other metals, such as stainless steel or copper, deposited thereon. Such conductive supports have important advantages, but at least one drawback for which the barrier layer compositions of the invention, and particularly certain preferred polyamide-co-imide polymers as described more fully hereinafter, provide a solution. The deposited nickel layers often have bumps or other irregularities which, when the barrier layer is thin, can cause an irregular electric field strength across the surface and thus cause defects, electrical breakdown, or so-called black spots in the resulting image. Thus, irregularities on the electrically conductive support make it desirable to have a barrier layer which can be coated at thicknesses which are adequate to smooth out this surface roughness. As an advantage over conventional barrier materials, the barrier materials of the present invention can be formed in relatively thick layers and still have desired electrophotographic properties. As a relatively thick layer, e.g., greater than 1 micron and, in more preferred embodiments, greater than 1.2 microns, preferably greater than about 2 microns, more preferably greater than about 3 microns, and most preferably greater than about 4 microns, the barrier layer of the invention can act as a smoothing layer and compensate for such surface irregularities. In particular, the preferred polyamide-co-imides described below can be coated as a relatively thick barrier layer, with good performance as an electrophotographic film element.

The barrier layer polymer employed is a condensation polymer that contains as a repeating unit a planar, electron-deficient aromatic tetracarbonylbisimide group as defined above. More specifically, in embodiments, the barrier layer polymer comprises a polyamide-co-imide which contains an aromatic tetracarbonylbisimide group, and has the formula:

wherein:

Q represents one or more groups selected from:

(a) an alkylenedioxy, alkylenedicarbonyl, aromatic dicarboxyl, aromatic dicarbonyl, and aromatic diamino groups having from about 2 to about 36 carbon atoms;

(b)

(c)
 and (d)

and where:

$Ar^3$, $Ar^4$, and $Ar^7$ independently represent a tetravalent aromatic group having from about 6 to about 20 carbon atoms;

$Ar^5$ and $Ar^6$ independently represent a trivalent aromatic group having from about 6 to about 12 carbon atoms;

$R^1$, $R^2$, $R^3$, $R^4$, $R^5$, and $R^6$ independently represent alkylene or alkyleneoxy groups having from about 2 to about 12 carbon atoms;

$L^1$, $L^2$, $L^3$, $L^4$, $L^5$, and $L^6$ independently represent CO or NH;

$Z^1$ and $Z^2$ independently represent an alkylenediacid, alkylenediamino, or alkyleneoxydiamino group having from about 2 to about 36 carbon atoms;

X is O, $C(CF_3)_2$, S=O or $SO_2$; and x and y represent mole fractions, x being the mole fraction of the group that contains $Ar^3$ and y being the mole fraction of the group, $Z^1$; and wherein x is from about 0.1 to about 0.8 and y is from 0 to about 0.95. More preferably, x is from about 0.25 to about 0.75, and even more preferably from about 0.5 to about 0.75, as such levels can allow for coating a barrier layer having a greater thickness, with the desired smoothing layer attributes previously mentioned above and no adverse impact on charge transport or other electrophotographic performance characteristics.

The barrier layer polymers in accordance with the invention thus contain planar, electron-deficient aromatic, functionalized bisimide groups in which the aromatic group is preferably a tri- or tetravalent benzene, perylene, naphthalene or anthraquinone nucleus. In addition to the carbonyl groups, aromatic groups in the foregoing structural formulas can have other substituents thereon, such as $C_{1-6}$alkyl, $C_{1-6}$alkoxy, or halogens.

Examples of useful imide structures include 1,2,4,5-benzenetetracarboxylic-bisimides:

1,4,5,8-naphthalenetetracarboxylic-bisimides:

3,4,9,10-perylenetetracarboxylic-bisimides:

2,3,6,7-anthraquinonetetracarboxylic-bisimides:

-continued hexafluoroisopropylidene-2,2',3,3'-benzenetetracarboxylic-bisimides:

Especially preferred are those with a fused ring system, such as naphthalenetetracarbonylbisimides and perylenetetracarbonylbisimides, as in many instances they are believed to transport electrons more effectively than a single aromatic ring structure. The preparation of such tetracarbonylbisimides is known and described, for example, in U.S. Pat. No. 5,266,429, the teachings of which are incorporated herein by reference in their entirety. These moieties are especially useful when incorporated into polyamide-co-imides as the sole electron-deficient moiety or when incorporated into such polymers in various combinations. The mole percent concentration of the electron deficient moiety in the polymer can desirably range from about 2.5 mol % to 100 mol %, preferably from about 5 mol % to 100 mol %, with a more preferred range being from about 10 mol % to about 80 mol %.

Examples of specific dicarbonyl groups, alkylenedioxy groups and alkylene groups that are suitable in the barrier layer polymers for photoconductive elements of the invention are cited in Sorreiro et al., U.S. Pat. No. 5,266,429, the teachings of which have previously been incorporated herein by reference.

The barrier layer polymers in accordance with the invention are prepared by condensation of at least one diamine compound with at least one dicarboxylic acid, ester, anhydride, chloride or mixtures thereof. Such polymers can have a weight-average molecular weight of 2,500 to 250,000, preferably 5,000 to 200,000, and more preferably from about 10,000 to about 150,000.

The bisimide structure containing the tetravalent-aromatic nucleus can be incorporated either as a diacid by reaction of the corresponding tetracarbonyidianhydride with the appropriate amino-acid. The resulting bisimide-diacids may then by polymerized, condensed with diacids, diol, or diamines, to prepare the barrier layer polymers by techniques well-known in the art, such as interfacial, solution, or melt polycondensation. A preferred technique is melt-phase polycondensation as described by Sorensen and Campbell, in "Preparative Methods of Polymer Chemistry," pp. 113–116 and 62–64, Interscience Publishing, Inc. (1961) New York, N.Y. Preparation of bisimides is also disclosed in U.S. Pat. No. 5,266,429, previously incorporated by reference.

Preferred diesters, diacids and dianhydrides for preparing the barrier layer polymers include terephthalic acid, dimethylisophthalate, isophthalic acid, maleic acid, 2,6-naphthanoic acid, 5-t-butylisophthalic acid, 1,4-cyclohexanedicarboxylic acid, 1,4-dimethylcyclohexanedicarboxylate (both the cis- and trans-isomers thereof), 1,1,3-trimethyl-3-(4-carboxyphenyl)-5-indancarboxylic acid, pyromellitic dianhydride, maleic anhydride, dimethyl succinate, dimethyl glutarate, dimethyl azelate, dimethyl adipate, dimethyl sebacate, dodecanediodic acid, and 1-methylsuccinic acid.

A preferred type of monomer are diesters, diacids and dianhydrides which comprise a divalent cyclohexyl moiety, such as 1,4-dimethylcyclohexanedicarboxylate, including both the cis- and trans- isomers thereof. These monomers are commercially available from Eastman Chemical Company of Kingsport, Tenn., and are available in the essentially pure trans-isomer form, as well as a mixture of both the cis- and trans-isomer forms (70/30 mole % mix of cis/trans-isomers respectively). This type of aliphatic monomer generally has more desirable electrical properties, such as lower dark decay levels, relative to other aliphatic monomers. It also provides an aliphatic moiety in the resulting polymer which is believed to be more resistant to degradation when the polymer is maintained in a coating solution for extended periods of time.

Diols and their equivalents can also be incorporated in preparing the barrier layer polymers and include ethylene glycol, polyethylene glycols, such as tetraethylene glycol, ethylene carbonate, 1,2-propanediol, 1-methyl-ethylene carbonate, 2,2'-oxydiethanol, 1,4-butanediol, 1,6-hexanediol, 1,10-decanediol, 1,4-cyclohexanedimethanol, 2,2-dimethyl-1,3-propanediol, and 4,4-isopropylidene-bisphenoxy-ethanol. In some preferred embodiments, polyethylene glycols, such as tetraethylene glycol, are added which allow for formation of a condensation polymer with ether repeat units in the polymer backbone that impart flexibility, i.e., toughness into the polymer, and, therefore, provide resistance to cracking of the photoconductor over time. Further, the ether repeat unit provided by using polyethylene glycols as a monomer also can result in increased electrical performance, such as in generally lower levels of residual, i.e., toe voltage. Preferred polyethylene glycols have a molecular weight of less than about 600, and more preferably less than about 300. In particular, it is preferable to employ from about 5 mol % to about 75 mole %, in terms of total moles of diol content, of such diols in preparation of the barrier layer condensation polymer to obtain a desirable amount of ether repeat units and corresponding flexibility in the polymer backbone. More preferably from about 5 mol % to about 50 mol % of such diol is present, based on total moles of diols employed.

The described polymers are all good film formers and exhibit excellent adhesion to most substrates of interest. These polymers resist attack by the solvent employed for the next film layer, in this case the solvent for the charge-generation-layer (CGL). Resistance to CGL-solvent renders the barrier layer essentially intact and results in controlled thickness as well as reproducible film electrical properties.

The condensation polymers of the invention also yield barrier layers having significantly reduced dielectric breakdown or black spots.

The following examples further illustrate the invention and are merely intended to illustrate specific embodiments and should not be construed as limiting the scope thereof. Unless otherwise indicated, all parts and percentages are by weight and temperatures are in degrees Celsius (° C.).

SPECIFIC EMBODIMENTS OF THE INVENTION

Polyamide-Co-Imide Polymers

The polyamide-co-imides described hereinafter are prepared by known techniques for melt phase polycondensation, as generally described by Sorenson et al, cited above, at pp. 62–64.

Control of reaction stoichiometry is required in order to achieve both high conversion and molecular weight. The samples of the invention are prepared by melt phase polycondensation techniques from either combinations of the appropriate diacids and diamines or the salts of these diacids and diamines.

Comparative Polymer A

This comparative polymer is a commercially available aliphatic polyamide sold under the trade name "Amilan CM8000" by the Toray Company, Ltd. of Japan. This polymer is identified in U.S. Pat. No. 5,876,889, which is incorporated herein by reference, as 6/66/610/12 copolymerized nylon. Identification of the monomers which form the 6/66/610/12 copolymer are:

—⁅NH(CH₂)₆NHCO(CH₂)₈CO⁆— Nylon 610

—⁅NH(CH₂)₁₁CO⁆— Nylon 12

—⁅NH(CH₂)₆NHCO(CH₂)₄CO⁆— Nylon 66

—⁅NH(CH₂)₅CO⁆— Nylon 6

Comparative Polymer B

Poly [dodecamethylene-co-piperazino (50/50) 1,1,3-trimethylphenylindane-co-dodecamethylene (50/50)] amide].

A mixture of 162 g (0.50 mole) of 1,1,3-trimethyl-3-(4-carboxyphenyl)-5-indancarboxylic acid, 115.15 g (0/.50 mole) of dodecanedioic acid, 43 g (0.50 mole) of piperazine, and 100 g (0.50 mole) of dodecanediamine is combined in a polymerization flask equipped with side arm and gas inlet tube. The contents are heated to 220° C. under a positive argon atmosphere to achieve a clear, homogenous melt. The polymerization temperature is raised from 220° C. to 280° C. over a period of four hours or until the evolution of distillate terminates. The flask is then equipped with stirrer and connected to a source of vacuum. The resulting product, Comparative Polymer B, is collected as a tough, amorphous solid which has a glass transition temperature of 89° C. and a weight average molecular weight of 105,000.

Polymer 1

Poly [1,3,3-trimethylcyclomethylene 1,4,5,8-naphthalenete-tracarbonyl-bis(imido-3-propylene)amide-co-dodecamethyleneamide (20/80)]amide.

A mixture of 184.2 g (0.80 moles) dodecandioic acid, 126.8 g (0.20 moles) of 1,4,5,8-naphthalenetetracarbonyl-bis(11-undecanoic acid)imide, and 170.3 g (1.00 moles) 5-amino-1,3,3-trimethylcyclohexanemethylamine contained in a polymerization flask equipped with a Claisen head and a nitrogen inlet tube is heated to 220° C. under a nitrogen atmosphere to produce a dark burgundy-colored, homogeneous melt. The temperature is slowly raised to 280° C. over several hours. Heating is continued until no further distillate is observed. A mechanical stirrer is introduced, and the flask is connected to a source of vacuum. The mixture is stirred under vacuum at 280° C. for about two hours, or until the desired melt viscosity is achieved, then the product is allowed to cool to room temperature. The resulting Polymer 1 is soluble in mixed solvents such as dichloromethane-methanol, and has a glass transition temperature of 102° C. and a weight average molecular weight of 80,000.

Polymer 2

Poly [dodecamethylene-co-1,4-piperazino (35/65) 1,4,5,8-napthalene-tetracarbonyl-bis(imido-3-propylene)amide-co-dodecamethyleneamide (10/90)]amide.

A mixture of 205.7 g (0.65 moles) dipiperazonium dodecanedioate, 107.6 g (0.25 moles), hexamethylenediammonium dodecanedioate, and 63.8 g (0.10 moles) hexamethylenediammonium 1,4,5,8-naphthalenetetracarbonyl-bisimido-3-propionate is combined and subjected to substantially the same polycondensation profile and procedure employed for Polymer 1. The resulting Polymer 2 has solubility in mixed solvents, a crystalline melting point of 114° C. and a weight average molecular weight of 72,500.

Polymer 3

Poly [1,3,3-trimethylcyclohexane-1,5-methylene 1,4,5,8-naphthalene-tetracarbonyl-bis(imido-11-undecamethylene)]amide.

A mixture of 634 g (1.00 moles) 1,4,5,8-naphthalenetetracarbonyl-bis(11-undecanoic acid)imide and 170.3 g (1.00 moles) 5-amino-1,3,3-trimethyl-cyclohexanemethylamine is combined and subjected to substantially the same polycondensation profile and procedure employed for Polymer 1. The resulting Polymer 3 exhibits solubility in dichloromethane-methanol, a crystalline melting point of 172° C. and a weight average molecular weight of 105,000.

Polymer 4

Poly[1,3,3-trimethylcyclohexane-1,5-methylene dodecamethylene-co-1,4,5,8-naphthalenetetracarbonyl-bis (imido-11-undecamethylene)(90/10)]amide.

A mixture of 200.3 g (0.5 moles) 1,3,3-trimethylcyclohexanemethyl-diammonium dodecandioate and 304.2 g (0.5 moles) 1,3,3-trimethylcyclohexane-methyldiammonium 1,4,5,8-naphthalenetetracarbonyl-bisimido-3-propionate is combined and subjected to substantially the same polycondensation profile and procedure employed for Polymer 1. The resulting Polymer 4 exhibits solubility in a mixture of dichloromethane-methanol and has a glass transition temperature of 152° C. and a weight average molecular weight of 25,000.

Polymer 5

Poly[1,3,3-trimethylcycylohexane-1,5-methylene 1,4,5,8-naphthalenetetra-carbonyl-bis(imido-11-undecamethylene)amide-co-dodecamethylene(40/60)]amide.

A mixture of 80.1 g (0.20 moles) 1,3,3-trimethylcyclohexanemethyldiammonium dodecanedioate, 253.5 g (0.40 moles) 1,4,5,8-naphthalenetetracarbonyl-bis (11-undecanoic acid)imide, and 68.1 g (0.40 moles) 5-amino-1,3,3-trimethylcyclohexanemethyamine is combined and subjected to substantially the same polycondensation profile and procedure employed for Polymer 1. The resulting Polymer 5 exhibits solubility in a mixture of dichlorormethane-methanol, has a glass transition temperature of 113° C. and a weight average molecular weight of 141,000.

Polymer 6

Poly[decamethylene-co-piperazino (70/30) decamethylene-co-1,1,3-trimethyl-3(4-phenylindanyl)-co-1,4,5,8-naphthalenetetracarbonyl-bisimidopropylene (50/30/20)]amide.

A mixture of 115.15 g (0.50 moles) of docecanedioic acid, 96.2 g (0.30 moles) of 1,1,3-trimethyl-3-(4-carboxyphenyl)-5-indancarboxylic acid, 87.6 g (0.20 moles) of 1,4,5,8-napthalenetetracarbonyl-bis(3-carboxypropyl)imide, 47.6 g (0.70 moles) of 1,4-piperazine, and 69.1 g (0.30 moles) of dodecane diamine is combined in a polymerization flask equipped with side arm and gas inlet tube, and heated to 200° C. to achieve a homogenous, optically transparent, dark burgundy-colored melt. The temperature is raised from 220° C. to 280° C. and maintained until no further distillate is detected. The flask is then equipped with a stirrer, fitted to a vacuum source, and polymerized to moderate-high melt viscosity. The resulting Polymer 6 has a glass transition temperature of 90° C. and a weight average molecular weight of 81,000.

The above-described polyamide-co-imides and comparative polymers are listed in Table I below and their respective responses to changes in relative humidity ("RH") is shown therein.

In the polyamide-co-imides as depicted by formula in Table I, $Ar^1$ represents a tetravalent aromatic group of from about 6 to 20 carbon atoms, R and $R^1$ independently represent alkylene or alkylenoxy groups of from about 2 to 12 carbon atoms, x is a mole fraction from about 0.1 to 1, y is a mole fraction from about 0 to 1 and z is a mole fraction from 0 to about 0.9.

TABLE I

POLYAMIDES

| Polymer | x | z | 1 − (x + z) | y | 1 − y | R | R' | R'' | R''' | % Water Loss From 70F/60% RH to 80F/20% RH |
|---|---|---|---|---|---|---|---|---|---|---|
| Comparative Polymer A | 0 | | | | | | | | | 1.276 |
| Comparative Polymer B | 0 | 0.50 | 0.50 | 0.50 | 0.50 | | $-\!\!+\!CH_2\!\!+\!\!-_{10}$ | piperazine | $-\!\!+\!CH_2\!\!+\!\!-_{10}$ | |
| 1 | 0.20 | 0.80 | | 1.00 | 0 | $-\!\!+\!CH_2\!\!+\!\!-_{3}$ | $-\!\!+\!CH_2\!\!+\!\!-_{10}$ | isophorone-diyl | | 0.172 |
| 2 | 0.10 | 0.90 | | 0.35 | 0.65 | $-\!\!+\!CH_2\!\!+\!\!-_{10}$ | $-\!\!+\!CH_2\!\!+\!\!-_{10}$ | piperazine | | 0.207 |
| 3 | 1.00 | 0 | | 1.00 | 0 | $-\!\!+\!CH_2\!\!+\!\!-_{10}$ | | isophorone-diyl | | 0.236 |
| 4 | 0.10 | 0.90 | | 1.00 | 0 | $-\!\!+\!CH_2\!\!+\!\!-_{3}$ | $-\!\!+\!CH_2\!\!+\!\!-_{10}$ | isophorone-diyl | | 0.244 |

TABLE I-continued

POLYAMIDES

[Structural formula of polyamide with tetracarbonylbisimide group, showing repeating units with x, y, z indices and pendant group containing 1,1,3-trimethylindane moiety with subscript 1-(x+z)]

| Polymer | x | z | 1 − (x + z) | y | 1 − y | R | R' | R" | R'" | % Water Loss From 70F/60% RH to 80F/20% RH |
|---|---|---|---|---|---|---|---|---|---|---|
| 5 | 0.40 | 0.60 | | 1.00 | 0 | ─(CH₂)₁₀─ | ─(CH₂)₁₀─ | ─CH₂─[3,3,5-trimethylcyclohexyl]─ | | 0.656 |
| 6 | 0.20 | 0.50 | 0.30 | 0.70 | 0.30 | ─(CH₂)₁₀─ | ─(CH₂)₁₀─ | ─N(piperazine)N─ | ─(CH₂)₁₀─ | |

(Values above: R in LaTeX form $-\!\!+\!CH_2\!\!+\!\!_{10}-$; R" for polymer 5 is 3,3,5-trimethylcyclohexylmethylene; R" for polymer 6 is piperazinyl.)

The data of Table I show that the percent water loss for the polymers employed in the photoconductive elements of the invention is smaller than the water loss for the control or comparative polymers which contain no planar, electron-deficient aromatic tetracarbonylbisimide group and which absorb and loose relatively large amounts of water with changes in relative humidity. As a result, the comparative polymers are susceptible to substantial variation in conductivity when employed in a barrier layer.

Polyamide-co-imide Polymers Prepared with Higher Levels of Charge Transport Monomer Polymer 7

Poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (20/50/30)]amide.

A mixture of 31.6 g (0.1 moles) of piperazonium dodecanedioate, 55.9 g (0.15 moles) of 1,3,3-trimethylcyclohexanemethylenediammonium sebacate, 42.6 g (0.25 moles) of 1,3,3-trimethylcyclohexanemethylenediamine, 158.5 g (0.25 moles) of 1,4,5,8-naphthalenetetracarbonyl-bis(11-undecanoic acid)imide is combined and subjected to substantially the same polycondensation profile and procedure employed for Polymer 1. The resulting Polymer 7 is soluble in mixed solvents such as dichloromethane-methanol, has a glass transition temperature of 112° C., and a weight average molecular weight of 130,000.

Polymer 8

Poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (20/75/5)]amide.

A mixture of 6.33 g (0.02 moles) of piperazonium dodecanedioate, 1.86 g (0.005 moles) of 1,3,3-trimethylcyclohexanemethylenediammonium sebacate, 12.77 g (0.075 moles) of 1,3,3-trimethylcyclohexanemethylenediamine, 47.55 g (0.075 moles) of 1,4,5,8-naphthalenetetracarbonyl-bis(11-undecanoic acid)imide is combined and subjected to substantially the same polycondensation profile and procedure employed for Polymer 1. The resulting Polymer 8 is soluble in mixed solvents such as dichloromethane-methanol, has a glass transition temperature of 115° C. and a melting temperature of 166° C., and a weight average molecular weight of 109,000.

Polymer 9

Poly [piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (25/70/5)]amide.

A mixture of 7.91 g (0.025 moles) of piperazonium dodecanedioate, 1.86 g (0.005 moles) of 1,3,3-trimethylcyclohexanemethylenediammonium sebacate, 11.92 g (0.07 moles) of 1,3,3-trimethylcyclohexanemethylenediamine, 44.38 g (0.07 moles) of 1,4,5,8-naphthalenetetracarbonyl-bis(11-undecanoic acid)imide is combined and subjected to substantially the same polycondensation profile and procedure employed for Polymer 1. The resulting Polymer 9 is soluble in mixed solvents such as dichloromethane-methanol, has a glass transition temperature of 111° C. and a melting temperature of 152° C. that was not present on the second heat, and a weight average molecular weight of 174,000.

Polymer 10

Poly[piperazine-co-1,3,3-trimethylcyclohexane-1,5-methylene (25/75) decamethylene-co-1,4,5,8-naphthalenetetracarbonyl-bis(imido-11-undecamethylene)-co-3,4,9,10-perylenetetracarbonyl-bis(imido-11-undecamethylene)-co-octamethylene (25/65/55)]amide.

A mixture of 39.6 g (0.125 moles) of piperazonium dodecanedioate, 9.3 g (0.025 moles) of 1,3,3-trimethylcyclohexanemethylenediammonium sebacate, 59.6 g (0.35 moles) of 1,3,3-trimethylcyclohexanemethylenediamine, 206.1 g (0.325 moles) of 1,4,5,8-naphthalenetetracarbonyl-bis(11-undecanoic acid)imide, 19.0 g (0.025 moles) of 3,4,9,10-perylenetetracarbonyl-bis(11-undecanoic acid)imide is combined and subjected to substantially the same polycondensation profile and procedure employed for Polymer 1. The resulting Polymer 10 is soluble in mixed solvents such as dichloromethane-methanol and after precipitation into methanol has a glass transition temperature of 110° C. and a melting temperature of 128° C. that was not present on the second heat, and a weight average molecular weight of 162,000.

Polymer 11

Poly[2,2'-(ethylenedioxy)bis(ethylene)-co-piperazine-co-1,3,3-trimethylcyclohexane-1,5-methylene (5/25/70) decamethylene-co-1,4,5,8-naphthalenetetracarbonyl-bis(imido-11-undecamethylene)-co-octamethylene (25/70/5)]amide.

A mixture of 7.91 g (0.025 moles) of piperazonium dodecanedioate, 1.75 g (0.005 moles) of 2,2'-(ethylenedioxy)bis(ethylammonium)-sebacate, 11.92 g (0.07 moles) of 1,3,3-trimethylcyclohexanemethylenediamine, 44.38 g (0.07 moles) of 1,4,5,8-naphthalenetetracarbonyl-bis(11-undecanoic acid)imide is combined and subjected to substantially the same polycondensation profile and procedure employed for Polymer 1. The resulting Polymer 11 is soluble in mixed solvents such as dichloromethane-methanol, has a glass transition temperature of 106° C., a melting temperature of 159° C. and a weight average molecular weight of 107,000.

Polymer 12

Poly[piperazine-co-1,3,3-trimethylcyclohexane-1,5-methylene (2575) decamethylene-co-1,4,5,8-naphthalenetetracarbonyl-bis(imidoproylene)-co-1,4,5,8-naphthalenetetracarbonyl-bis(imido-11-undecamethylene)-co-octamethylene (25/10/60/5)]amide.

A mixture of 7.91 g (0.025 moles) of piperazonium dodecanedioate, 1.86 g (0.005 moles) of 1,3,3-trimethylcyclohexanemethylenediammonium sebacate, 11.94 g (0.07 moles) of 1,3,3-trimethylcyclohexanemethylenediamine, 4.38 g (0.01 moles) of 1,4,5,8-naphthalenetetracarbonyl-bis(3-carboxypropyl)imide, 38.0 g (0.06 moles) of 1,4,5,8-naphthalenetetracarbonyl-bis(11-undecanoic acid)imide is combined and subjected to substantially the same polycondensation profile and procedure employed for Polymer 1. The resulting Polymer 12 is soluble in mixed solvents such as dichloromethane-methanol and after precipitation into methanol has a glass transition temperature of 116° C. and a weight average molecular weight of 140,000.

Polymer 13

Poly[2,2'-(ethylenedioxy)bis(ethylene)-co-piperazine-co-1,3,3-trimethylcyclohexane-1,5-methylene (10/25/65) decamethylene-co-1,4,5,8-naphthalenetetracarbonyl-bis(imidopropylene)-co-1,4,5,8-naphthalenetetracarbonyl-bis(imido-11-undecamethylene)-co-octamethylene (25/10/60/5)]amide.

A mixture of 7.91 g (0.025 moles) of piperazonium dodecanedioate, 1.86 g (0.005 moles) of 1,3,3-trimethylcyclohexanemethylenediammonium sebacate, 1.48 g (0.01 moles) of 2,2'-(ethylenedioxy)bis(ethylamine), 10.22 g (0.06 moles) of 1,3,3-trimethylcyclohexanemethylenediamine, 4.38 g (0.01 moles) of 1,4,5,8-naphthalenetetracarbonyl-bis(3-carboxypropyl)imide, 38.0 g (0.06 moles) of 1,4,5,8-naphthalenetetracarbonyl-bis(11-undecanoic acid)imide is combined and subjected to substantially the same polycondensation profile and procedure employed for Polymer 1. The resulting Polymer 13 is soluble in mixed solvents such as dichloromethane-methanol and after precipitation into methanol has a glass transition temperature of 106° C. and a weight average molecular weight of 114,000.

The examples which follow describe the preparation and testing of photoconductive elements of the invention and of comparative photoconductive elements. They are referred to, respectively, as "examples" and as "comparative examples".

COMPARATIVE EXAMPLE 1

A multiactive photoconductive film comprising a conductive support, a barrier layer, a charge generation layer (CGL), and a charge transport layer (CTL), coated in that order, is prepared using the following compositions and conditions.

Coated on nickelized poly (ethylene) terephthalate, at dry coverage of 0.05 g/ft² is a barrier layer of Amilan CM8000 polyamide having no planar tetracarbonylbisimide repeating unit. The barrier layer is prepared at 2.5 wt % in a 65/35 (wt/wt) mixture of ethanol and dichloromethane. A coating surfactant, SF1023, available from General Electric Company is added to the barrier layer coating solution at a concentration of 0.003 wt % of the total solution.

A second layer (CGL) is coated on the barrier layer at a dry coverage of 0.05 g/ft². The CGL mixture comprised 50% of a 75/25 co-crystalline pigment mixture of titanyl pthalocyanine and tetrafluoro titanyl phthalocyanine, prepared substantially as described in Molaire et al U.S. Pat. No. 5,614,342 and 50% of a polyester ionomer binder, poly[2,2-dimethyl-1,3-propylene-co-oxydiethylene (80/20) isophthalate-co-5-sodiosulfoisophthalate (95/5)] prepared substantially as described in Molaire et al. U.S. Pat. No. 5,733,695. The CGL mixture is prepared at 3 wt % in a 65/35 (wt/wt) mixture of dichloromethane and 1,1,2-trichloroethane, as described in U.S. Pat. No. 5,614,342. A leveling agent, DC510 available from Dow-Corning Company of Midland, Mich. is added at a concentration of 0.019 wt % of the total solution.

A third layer (CTL) is coated onto the CGL at a dry coverage of 2.3 g/ft². The CTL mixture comprised 50-wt % Makrolon 5705, 10% poly[4,4'-(norbomylidene) bisphenol terephthalate-co-azelate (60/40)], 20 wt % of 1,1-bis[4-(di-4-tolylamino)phenyl]cyclohexane, and 20 wt % tri-(4-tolyl) amine. The CTL mixture is prepared at 10 wt % in dichloromethane. A coating surfactant, DC510, is added at a concentration of 0.016 wt % of the total mixture.

Evaluation

The photoconductor film element obtained by Comparative Example 1 is tested in a laboratory apparatus that charges, exposes and erases the film continuously. The residual or "toe" voltage after 10,000 cycles is recorded for the film, and the value is listed in Table II below.

EXAMPLE 1

A photoconductive element is prepared substantially as described in Comparative Example 1, except that the barrier layer polymer is Polymer 7. The barrier layer is prepared at 2.5 wt % in a 55/35/10 wt mixture of 1,1,2-trichloroethanedichloromethaneethanol and coated to give a 1.6 micron layer. The residual voltage after 10,000 cycles for the resulting photoconductive film element is evaluated substantially according to the above-described procedure and the value obtained is also shown in Table II.

EXAMPLES 2A–B

A photoconductive film element is prepared substantially as described in Comparative Example 1, except that the barrier layer polymer is Polymer 9. The barrier layer is prepared at 2.5 wt % in a 55/35/10 wt mixture of 1,1,2-trichloroethanedichloromethaneethanol and coated to give a 1.3 micron thick layer (Example 2A) and a 2.0 micron thick layer (Example 2B). The residual voltage after 10,000 cycles for the photoconductive elements is measured and shown in Table II.

EXAMPLE 3

A photoconductive film element is prepared substantially as described in Comparative Example 1, except that the barrier layer polymer is Polymer 10. The barrier layer is prepared at 2.5 wt % in a 55/35/10 wt mixture of 1,1,2-trichloroethanedichloromethaneethanol and coated to give a 1.5 micron thick layer. The residual voltage after 10,000 cycles for the photoconductive film element is also determined and shown in Table II.

TABLE II

| Example | Barrier Polymer | Vtoe @ 20% RH Initial | Vtoe @ 20% RH 10,000 cycles | Delta |
|---|---|---|---|---|
| Comparative Example 1 | Amilan | −17 | −317 | 300 |
| Example 1 | Polymer 7 1.6 microns | −86 | −63 | 23 |
| Example 2A | Polymer 9 1.3 microns | −61 | −35 | 26 |
| Example 2B | Polymer 9 2.0 microns | −69 | −38 | 31 |
| Example 3 | Polymer 10 1.5 microns | −50 | −30 | 20 |

As indicated in Table II, utilizing barrier layers of Polymers 7, 9, and 10 show that one can allow for coating polyamide-co-imides barrier polymers in relatively thick layers, and also obtain very desirable residual toe voltages when used in an electrophotographic process. Such polymers are soluble in polar solvents, and also solvent blends, including ethanol, as described in Example 1.

The following Comparative Examples 2–3 and Example 4 demonstrate the effect of incorporating naphthalene bisimide moieties into barrier layers for regeneration of photoconductive films.

COMPARATIVE EXAMPLE 2

A photoconductive film element is prepared substantially as described in Comparative Example 1, except that the barrier layer polymer, Comparative Polymer A of Table I—Amilan CM80000 polyamide, is coated at a dry coverage of 0.1 g/ft$^2$.

COMPARATIVE EXAMPLE 3

A photoconductive element is prepared substantially as described in Comparative Example 1, except that the barrier layer polymer is Comparative Polymer B of Table I. The barrier layer is prepared at 2.5 wt % in a 65/35 (wt/wt) mixture of ethanol and dichloromethane. A coating surfactant, SF1023, is added to the barrier layer coating solution at a concentration of 0.003 wt % of the total solution. The barrier layer is coated at a dry coverage of 0.1 g/ft$^2$.

EXAMPLE 4

A photoconductive element of the invention is prepared substantially as described in Comparative Example 1, except that the barrier layer polymer is Polymer 6 of Table I. The barrier layer is prepared at 2.5 wt % in a 65/35 (wt/wt) mixture of ethanol and dichloromethane. A coating surfactant, SF1023, is added to the barrier layer coating solution at a concentration of 0.003 wt % of the total solution. The barrier layer is coated at a dry coverage of 0.1 g/ft$^2$.

The photoconductor film elements obtained by Comparative Examples 2–3 and Example 4 are each tested in an apparatus that charges, exposes and erases the film continuously. The residual, or toe, voltage after 1000 cycles (toe@20% RH) is recorded for each film. and are shown in Table III. The results show that elements of the invention, such as Example 4, even with a relatively thick barrier layer, can outperform those like Comparative Examples 2–3 by exhibiting lower differences between the initial toe voltage (in Volts) and the voltage after 1000 cycles, as recorded in the "Delta" column of Table III.

TABLE III

| Example | Barrier Polymer | Vtoe @ 20% RH Initial | Vtoe @ 20% RH 1000 cycles | Delta |
|---|---|---|---|---|
| Comp. Example 2 | CM8000 Amilan | −22 V | −110 V | +88 V |
| Comp. Example 3 | Comparative Polymer B | −153 V | −243 V | +90 V |
| Example 4 | Polymer 6 | −41 V | −60 V | +19 V |

Black Spots Evaluation

As disclosed in Bugner et al U.S. Pat. No. 5,681,677, incorporated herein by reference, in a Discharged Area Development (DAD) system, such as a high speed laser or LED printer, black spot formation can occur with certain photoconductive elements. The choice of barrier layer and its thickness is critical to minimize and eliminate the formation of black spots. The following examples demonstrate the good performance of photoconductive elements of the invention, and are coated using a 30 mm drum format compatible with the Hewlett Packard LaserJet 5Si commercial laser printer.

COMPARATIVE EXAMPLE 4

A multiactive photoconductive element comprising an endless conductive nickel sleeve 180 mm diameter, 5 mil thick and 395 mm long, manufactured by Stork Rotaform, with a barrier layer, a charge generation layer (CGL), and a charge transport layer (CTL), coated in that order, thereon is prepared as follows:

Coated on the endless seamless nickel sleeve using the dip coating process, at dry coverage of 0.15 g/ft$^2$, is a barrier layer of Amilan CM8000 polyamide. The barrier layer is solution coated using 3.5 wt % in a 65/35 (wt/wt) mixture of ethanol and dichloromethane. A coating surfactant, SF1023, is added to the barrier layer coating solution at a concentration of 0.003 wt % of the total solution.

A second layer (CGL) is coated on the barrier layer at a dry coverage of 0.05 g/ft$^2$. The CGL mixture comprises 50% of a 90/10 co-crystalline pigment mixture of titanyl pthalocyanine and tetrafluoro titanyl phthalocyanine, prepared substantially as described in Molaire et al. U.S. Pat. No. 5,614,342, the teachings of which are incorporated herein by reference, and 50% of a polyester ionomer binder, poly [2,2-dimethyl-1,3-propylene-co-oxydiethylene (80/20) isophthalate-co-5-sodiosulfoisophthalate (95/5)] prepared as described in Molaire et al. U.S. Pat. No. 5,733,695, the teachings of which are also incorporated herein by reference. The CGL mixture is prepared at 3 wt % in a 65/35 (wt/wt) mixture of dichloromethane and 1,1,2-trichloroethane, as described in U.S. Pat. No. 5,614,342. A leveling agent, DC510, is added at a concentration of 0.019 wt % of the total solution.

A third layer (CTL) is coated onto the CGL at a dry coverage of 2.3 g/ft$^2$. The CTL mixture comprises 30 wt % Makrolon 5705 polymer available from Mobay Company, 20 wt % Lexan polymer available from General Electric Company, 10 wt % poly[4,4'-norbornylidene-bisphenol terephthalate-co-azelate (60/40)], 20 wt % of 1,1-bis [4-(di-4-tolylamino)phenyl]cyclohexane, and 20 wt % tri-(4-tolyl) amine. The CTL mixture is prepared at 10 wt % in dichloromethane. A coating surfactant, DC510, is added at a concentration of 0.016 wt % of the total mixture.

COMPARATIVE EXAMPLE 5

The methods and compositions of Comparative Example 4 are employed to coat a 30 mm aluminum drum, compatible with the HP LaserJet 5Si laser printer, with a photoconductive composition, except that no barrier layer is used and the CGL layer is coated over a bare aluminum substrate.

COMPARATIVE EXAMPLES 6 A–D

The procedures of Comparative Example 5 are substantially repeated for Comparative Examples 6 A–D, except that Amilan CM8000 polymer is used as a barrier layer and coated onto the drum at a thickness of 0.1, 0.3, 0.8, and 1.7 microns respectively.

EXAMPLES 5 A–C

A photoconductive element is prepared substantially according to the procedures of Comparative Examples 6 A–D, except that Polymer 1 of Table I is used as the barrier layer. The barrier layer is coated to produce a layer thickness of 0.2, 0.8 and 1.2 microns respectively.

To evaluate "black spots" formation susceptibility of the foregoing drums, the drum being evaluated is used to replace the original drum of an HP5Si cartridge. A "white page" is generated using the LaserJet 5Si laser printer for each drum sample. The generated white pages are scanned and analyzed for black spots by known methods. Correction is made for single toner background particles. The area analyzed is kept constant for all samples. The lower the "black spot count" shown in Table IV, the better is the barrier layer. The results are shown in Table IV. The effect of barrier thickness can be seen. Without any barrier, black spot count is above 15,000. It is down to 241 for a 0.8-micron Amilan CM8000.

Examples 5 A–C show good performance for similar barrier layer thickness. Barrier layers corresponding to the invention, such as Examples 5 A–C, show low levels of black spots and are comparable to the results obtained with a barrier layer of the Amilan polymer, however, as shown previously, electrical performance, i.e., toe voltages, obtained with the barrier layers of the invention are better than that obtained with the Amilan polymer.

TABLE IV

| Example | Barrier Polymer | Thickness Microns | Black Spot Count |
|---|---|---|---|
| Comp Example 5 | None | None | 15,667 |
| Comp Example 6A | Amilan CM8000 | 0.1 | 5,587 |
| Comp Example 6B | Amilan CM8000 | 0.3 | 449 |
| Comp Example 6C | Amilan CM8000 | 0.8 | 241 |
| Comp Example 6D | Amilan CM8000 | 1.7 | 265 |
| Example 5A | Polymer 1 | 0.2 | 662 |
| Example 5B | Polymer 1 | 0.8 | 333 |
| Example 5C | Polymer 1 | 1.2 | 294 |

EXAMPLE 6

Polymer 7 is coated as a barrier layer at approximately 1.5 microns on a seamless nickel sleeve substantially as described in Comparative Example 4. The resulting photoconductive element is placed in a NexPress 2100 Printer available from NexPress Solutions, LLC of Rochester, N.Y., and is evaluated for "black spot" formation substantially as otherwise described in Comparative Examples 6 A–D, and Examples 5 A–C above. The test is carried out at 75° C. and 35% relative humidity ("RH"). The number of black spots at the beginning of the test is 79 and after one hour of operation it is 51, both of which are very good. The residual voltage is approximately 100 V.

EXAMPLES 7 A–C

Polymer 9 is coated as a barrier layer on three seamless nickel sleeves at a thickness of approximately 1.1, 1.4 and 2.0 microns respectively, by following procedures substantially as described in Comparative Example 4. The photoconductive element is placed in a NexPress 2100 Printer, and evaluated for "black spot" formation substantially as otherwise described in Comparative Examples 6 A–D, and Examples 5 A–C. The test is carried out at 75° C. and 35% RH. The residual voltage and number of black spots are measured both at the start of the test and after operation of the machine for the period of time specified in Table V below. The number of black spots at the beginning of the test was below 100 in all of the tests and remained at the low level after operation of the machine for the time period shown in Table V. The residual voltage is approximately 100 V for all of the tests.

TABLE V

| Example No. | Barrier Layer Thickness (μm) | Time | Residual Volt. (V) | blackspots |
|---|---|---|---|---|
| 7A | 1.1 | Initial | 95 | 63 |
| 7A | 1.1 | 2,000 prints | 92 | 66 |
| 7B | 1.4 | Initial | 106 | 64 |
| 7B | 1.4 | 2 hours | 94 | 83 |
| 7C | 2.0 | Initial | 117 | 46 |

EXAMPLE 8

Polymer 10 is coated as a barrier layer on a seamless nickel sleeve at approximately 1.6 microns substantially as described in Comparative Example 4. The photoconductive element is placed in a NexPress 2100 Printer and evaluated substantially as described in Examples 7 A–C. The test is carried out at 75° C. and 35% RH and the residual voltage is found to be acceptable at 127 V.

COMPARATIVE EXAMPLE 7

A photoconductive film element is prepared substantially as described in Comparative Example 1, except that the barrier layer including Comparative Polymer A of Table I—Amilan CM8000 polyamide—is coated at a dry coverage of 0.16 g/ft$^2$. The thickness of the resulting barrier layer is about 1.6 microns.

EXAMPLES 9 A–C

A photoconductive film element is prepared substantially as described in Comparative Example 1, except that the barrier layer polymer is Polymer 11 coated at three levels of coverage. The barrier layer is also prepared at 5 wt % in a 5/85/5 wt mixture of 1,1,2-trichloroethae/dichloromethane/methanol and coated to give a layer thickness of 1.0, 2.0, and 3.0 microns respectively. The films are tested in a laboratory apparatus that charges, exposes, and erases the film continuously under controlled environments of temperature and relative humidity (RH). The residual or "toe" voltage initially and after 1000 cycles is recorded for each of the films and or drums as previously described and is shown in Table VI. The number of black spots is also shown.

Barrier layer thickness as reported herein and elsewhere in this Specification is obtained by measurement of optical micrograph cross-sections according to known analytical methods within the art.

EXAMPLES 10 A–C

A photoconductive element is prepared substantially as described in Comparative Example 1, except that the barrier layer polymer is Polymer 12 coated at three levels of coverage. The barrier layer is prepared at 5 wt % in a 5/85/5 wt mixture of 1,1,2-trichloroethae/dichloromethane/methanol and coated to give a barrier layer thickness of 1.0, 2.0, and 3.0 microns respectively. The residual voltage initially and after 1,000 cycles for the photoconductive elements is determined according to the procedures previously described and shown in the Table VI.

EXAMPLES 11 A–C

A photoconductive element is prepared substantially as described in Comparative Example 1, except that the barrier layer polymer is Polymer 13 coated at three levels of coverage. The barrier layer is prepared at 5 wt % in a 5/85/5 wt mixture of 1,1,2-trichloroethae/dichloromethane/methanol and coated to give a 1.0, 2.0, and 3.0 micron layers. The residual voltage both initially and after 1,000 cycles for the photoconductive elements obtained by Comparative Example 7 and Examples 11 A–C is evaluated according to the procedures previously described and are shown in the Table VI.

TABLE VI

| Example | Barrier Polymer/ Thickness ($\mu$m) | Vtoe (Volts) @ 20% RH Initial | Vtoe (Volts) @ 20% RH 1000 cycles | Delta | Blackspots |
|---|---|---|---|---|---|
| Comparative Example 7 | Comparative Polymer A Amilan 1.6 microns | −27 | −302 | 275 | — |
| Example 9A | Polymer 11 1.0 microns | −47 | −77 | 30 | 1034 |
| Example 9B | Polymer 11 2.0 microns | −47 | −67 | 20 | 683 |
| Example 9C | Polymer 11 3.0 microns | −48 | −70 | 22 | 232 |
| Example 10A | Polymer 12 1.0 microns | −69 | −122 | 53 | — |
| Example 10B | Polymer 12 2.0 microns | −88 | −144 | 56 | — |
| Example 10C | Polymer 12 3.0 microns | −111 | −165 | 54 | — |
| Example 11A | Polymer 13 1.0 microns | −57 | −115 | 58 | — |
| Example 11B | Polymer 13 2.0 microns | −65 | −123 | 58 | — |
| Example 11C | Polymer 13 3.0 microns | −82 | −143 | 61 | — |

"—" means not measured.

The above Polymers 7–13 demonstrate that relatively high levels of an electron charge transport moiety can be incorporated into the polyamide-co-imide polymers of the invention. These polymers have more than 50 mole % transport agent therein with varying combinations of naphthalene and perylene based charge transport moieties. The increasing amount of transport agent allows for lower residual voltages and thicker barrier layers to be employed. This has advantages in reducing the number of blackspots and breakdown. Thicker barrier layers also allow for the use of less perfect substrates, as a rougher surface can be rendered smooth by the thicker barrier layer.

COMPARATIVE EXAMPLE 8 AND EXAMPLES 12–14

Electron Transport Ability For Polymers 10, 12, and 13

Electrochemical experiments give further evidence of the ability of the polyamide-co-imide polymers employed in the invention to transport electrons. Polymers 10, 12, and 13 are analyzed using cyclic voltammetry and reduction potential data obtained with a Model CHI660 electrochemical analyzer available from CH Instruments, Inc. of Austin, Tex. A glassy carbon disk electrode (Area=0.071 cm$^2$) is used as the working electrode. The working electrode is also polished using a 0.05 μm alumina slurry, and followed by electrochemical treatment prior to use. A platinum wire serves as the counter electrode. Potentials are recorded against a saturated calomel electrode (SCE). A mixture of methylene chloride and methanol (75%/25%, v/v) is used as the solvent. Tetrabutylarnmonium tetrafluoroborate (TBABF$_4$) is used as supporting electrolyte. The testing solution is purged with high purity nitrogen gas for approximately 15 minutes to remove oxygen and a nitrogen blanket is flowed over the solution during the course of the measurement. All measurements are performed at ambient temperature of 25±1° C.

Figure 2:
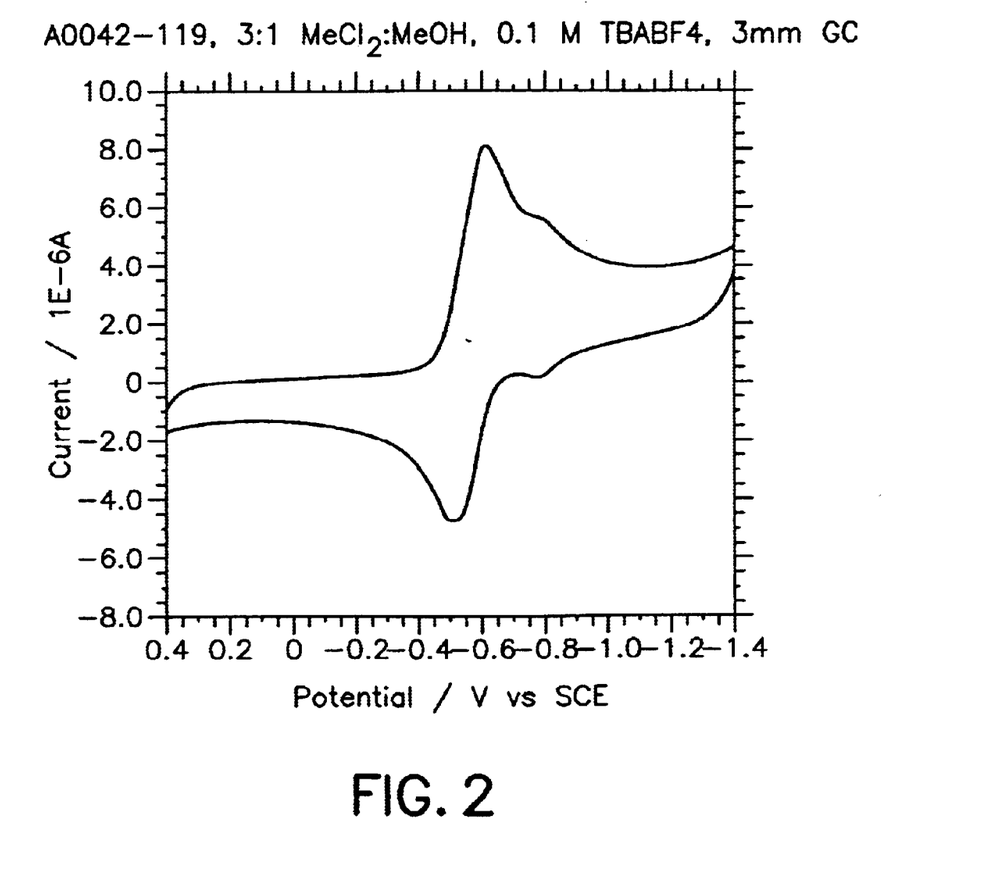
FIG. 2 is a voltammagram showing current (in terms of $1 \times 10^{-6}$ amps) versus potential (in terms of volts vs. a saturated calomel electrode) for Polymer 10 as more fully described in Example 12 hereinafter.
Figure 3:
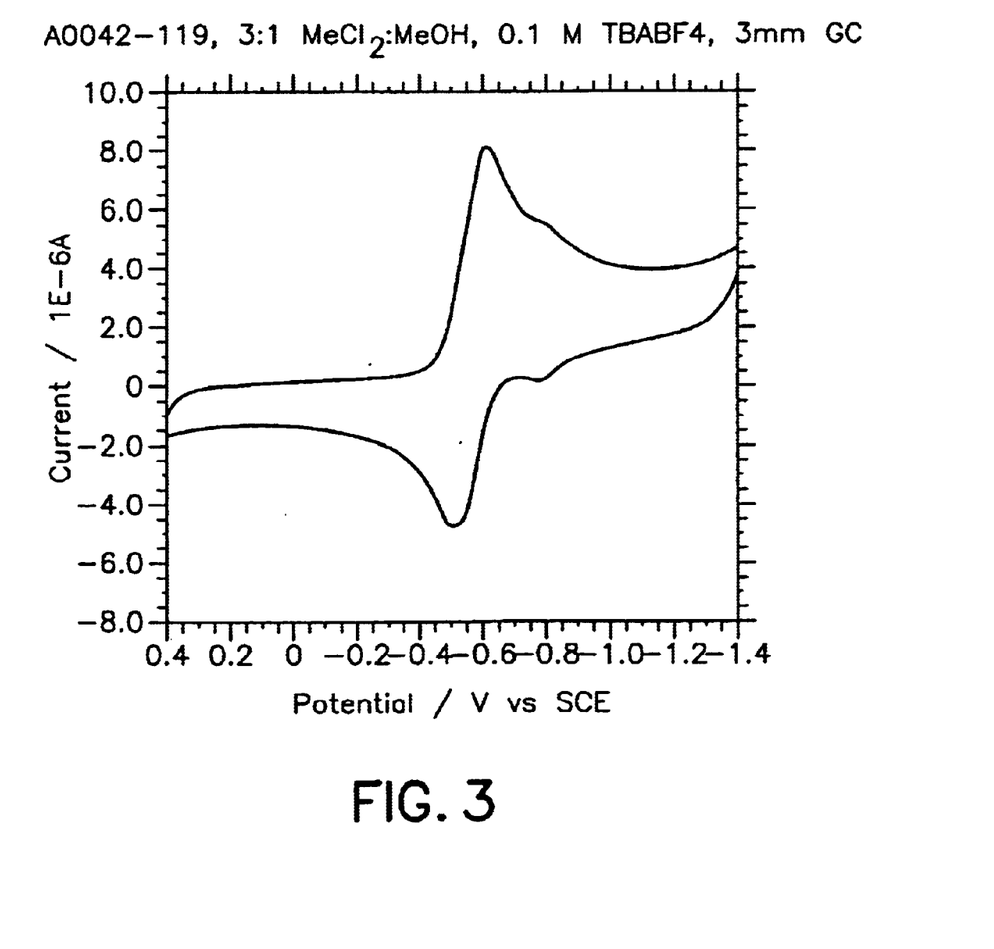
FIG. 3 is a voltammagram showing current (in terms of $1 \times 10^{-6}$ amps) versus potential (in terms of volts vs. a saturated calomel electrode) for Polymer 12 as more fully described in Example 13 hereinafter.
Figure 4:
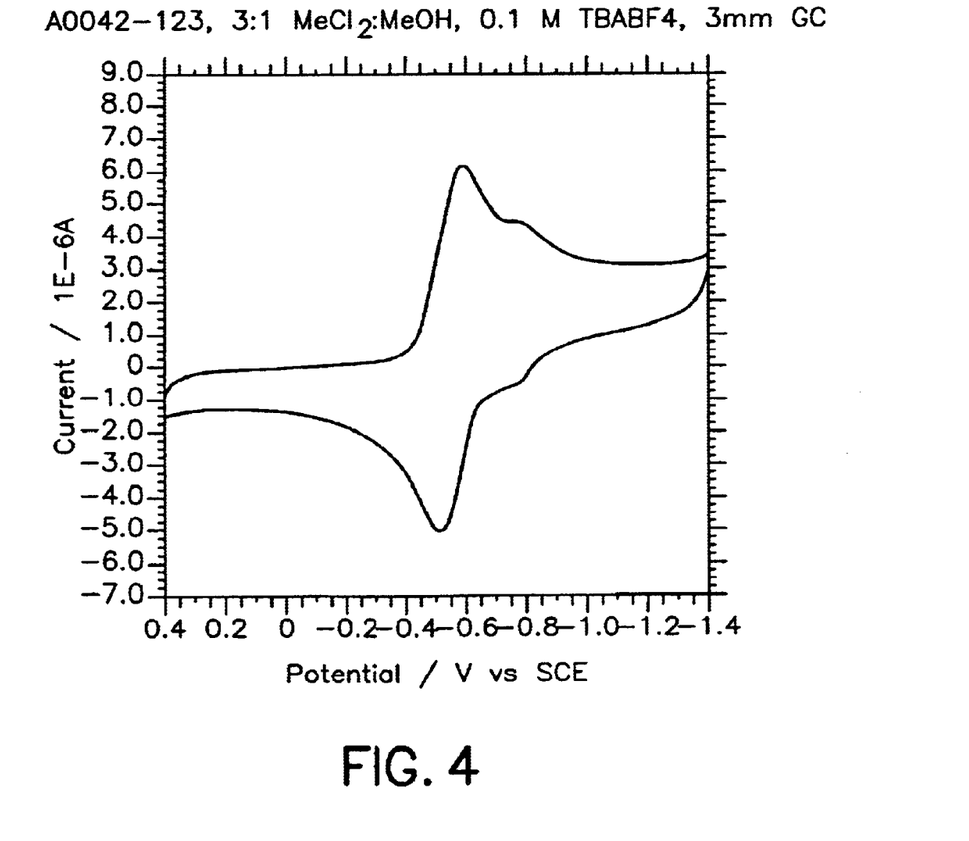
FIG. 4 is a voltammagram showing current (in terms of $1 \times 10^{-6}$ amps) versus potential (in terms of volts vs. a saturated calomel electrode) for Polymer 13 as more fully described in Example 13 hereinafter.

The reduction potentials of the polymers studied are summarized in Table VII and a cyclic voltammagram for each example is shown in FIGS. 2–4, with FIG. 2 showing the data for Example 12, FIG. 3 showing the data for Example 13, and FIG. 4 showing the data for Example 14. Since the three polymers evaluated contain a similar electron transport moiety, their reduction potentials display relatively minor differences therebetween.

FIG. 2 shows that Polymer 10 has an ability to transport electrons due to the reversible peaks. This is attributable to use of the naphthalene and perylene bisimides into the polymer.

FIG. 3 shows that Polymer 12 has an ability to transport electrons due to the reversible peaks. This is attributable to use of the naphthalene bisimides into the polymer.

FIG. 4 shows that Polymer 13 has an ability to transport electrons due to the reversible peaks. This is attributable to use of the naphthalene bisimides into the polymer.

Figure 5:
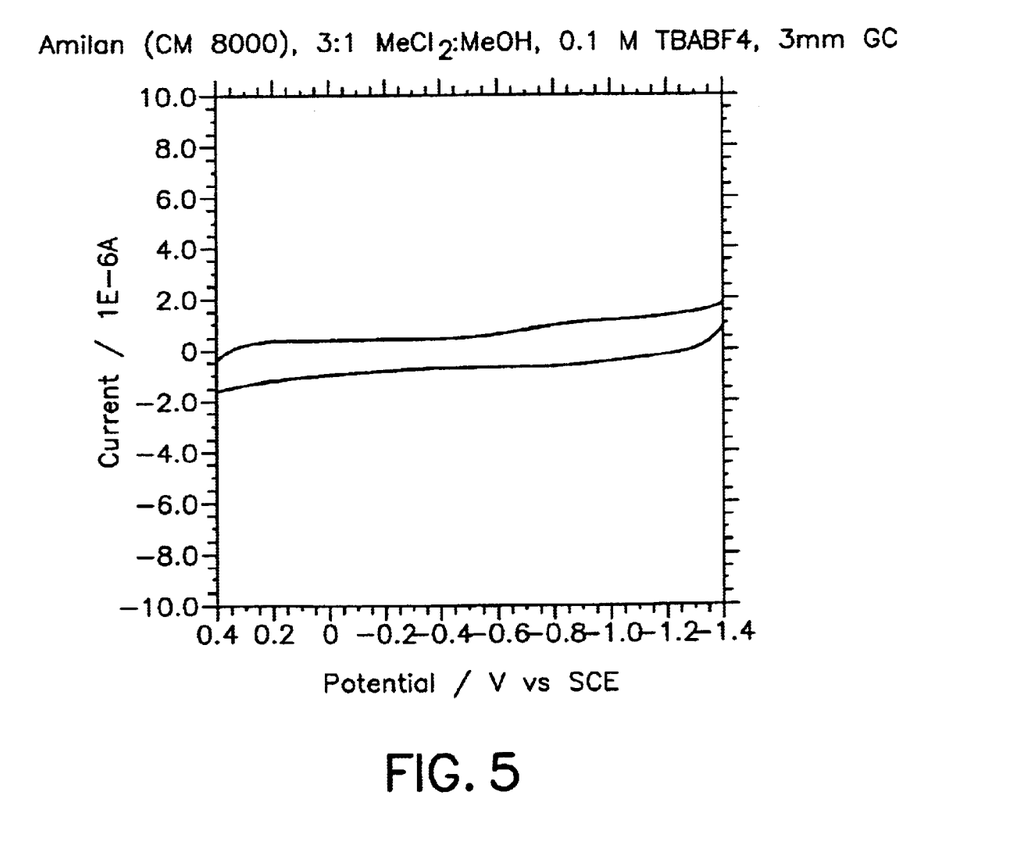
FIG. 5 is a voltammagram showing current (in terms of $1 \times 10^{-6}$ amps) versus potential (in terms of volts vs. a saturated calomel electrode) for Comparative Polymer A, i.e., Amilan CM 8000, as more fully described in Comparative Example 8 hereinafter.

In Comparative Example 8, the Comparative Polymer A, i.e., Amilan CM 8000, is similarly measured, and the data obtained is shown in FIG. 5. The cyclic voltammagram shows that the polymer has no reduction wave and no corresponding electron transport ability.

TABLE VII

| Polymer ID | E$^{o'}$ (red)/V vs. SCE* |
|---|---|
| 10 | −0.558 |
| 12 | −0.541 |
| 13 | −0.548 |

*Average of three measurements.

Good barrier properties are also obtained by addition of longer ethylene oxide repeat blocks to the polymers. Additionally, introduction of longer, more flexible ether blocks due to the tetraethylene glycol produces a higher molecular weight polymer. As discussed hereinabove, these polymers should have less of a tendency to crack on flexible supports.

The invention has been described in detail with particular reference to certain preferred embodiments thereof, but it will be understood that variations and modifications can be effected within the spirit and scope of the invention.

We claim:

1. A photoconductive element comprising an electrically conductive support, an electrical barrier layer disposed over said electrically conductive support, and disposed over ad barrier layer, a charge generation layer capable of generating positive charge carriers when exposed to actinic radiation, said barrier layer comprising a polyamide-co-imide polymer that includes an aromatic tetracarbonylbisimide group, and which polymer corresponds to the formula:

wherein:

Q represents one or more groups selected from:

(a) an alkylenedioxy, alkylenedicarbonyl, aromatic dicarboxyl, aromatic dicarbonyl, and aromatic diamino groups having from about 2 to about 36 carbon atoms;

(b)

(c)

and (d)

and where:

Ar$^3$, Ar$^4$, and Ar$^7$ independently represent a tetravalent aromatic group having from about 6 to about 20 carbon atoms;

Ar$^5$ and Ar$^6$ independently represent a trivalent aromatic group having from about 6 to about 12 carbon atoms;

R$^1$, R$^2$, R$^3$, R$^4$, R$^5$, and R$^6$ independently represent alkylene or alkyleneoxy groups having from about 2 to about 12 carbon atoms;

L$^1$, L$^2$, L$^3$, L$^4$, L$^5$, and L$^6$ independently represent CO or NH;

Z$^1$ and Z$^2$ independently represent an alkylenediacid, alkylenediamino, or alkyleneoxydiamino group having from about 2 to about 36 carbon atoms;

X is O, C(CF$_3$)$_2$, S=O or SO$_2$; and x and y represent mole fractions, x being the mole fraction of the group that contains Ar$^3$ and y being the mole fraction of the group, $Z^1$; and wherein x is from about 0.05 to 1 and y is from 0 to about 0.95.

2. The photoconductive element of claim 1 wherein x is from about 0.1 to about 0.8.

3. The photoconductive element of claim 1 wherein x is from about 0.25 to about 0.75.

4. The photoconductive element of claim 1 wherein x is from about 0.5 to about 0.75.

5. The photoconductive element of claim 1 wherein the electrically conductive support comprises a flexible material having a layer of metal disposed thereon.

6. The photoconductive element of claim 5 wherein the metal is nickel.

7. The photoconductive element of claim 1 wherein the condensation polymer further comprises alkyleneoxy repeat groups having from about 2 to about 36 carbon atoms.

8. The photoconductive element of claim 7 wherein the alkyleneoxy repeat groups are derived by condensation of a polyethylene glycol having a molecular weight of less than about 600.

9. The photoconductive element of claim 7 wherein the alkyleneoxy repeat groups are derived by condensation of a polyethylene glycol having a molecular weight of less than about 300.

10. The photoconductive element of claim 7 wherein the alkyleneoxy repeat units are present in an amount of up to about 95 mol % based on total diamine content.

11. The photoconductive element of claim 7 wherein the alkyleneoxy repeat units are present in an amount of from about 0.05 mol % to about 0.75 mol % based on total diamine content.

12. The photoconductive element of claim 7 wherein the alkyleneoxy repeat units are present in an amount of from about 0.05 mol % to about 0.5 mol % based on total diamine content.

13. The photoconductive element of claim 1 wherein the condensation polymer is substantially insoluble in a solvent employed for coating the charge generation layer onto the barrier layer.

14. The photoconductive element of claim 1 wherein the barrier layer has a thickness of greater than about 1 micron.

15. The photoconductive element of claim 1 wherein the barrier layer has a thickness of greater than 1.2 microns.

16. The photoconductive element of claim 4 wherein the barrier layer has a thickness of greater than about 2 microns.

17. The photoconductive element of claim 4 wherein the barrier layer has a thickness of greater than about 3 microns.

18. The photoconductive element of claim 4 wherein the barrier layer has a thickness of greater than about 4 microns.

19. The photoconductive element of claim 4 wherein the condensation polymer is poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (20/50/30)]amide.

20. The photoconductive element of claim 4 wherein the condensation polymer is poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (20/75/5)]amide.

21. The photoconductive element of claim 4 wherein the condensation polymer is poly[piperazine-co 1,3,3-trimethylcyclohexane-1,5-methylene (20/80) decamethylene-co-1,4,5,8-naphthalenetetracarbonyl-bis(imido-11-undecamethylene)-co-octamethylene (25/70/5)]amide.

22. The photoconductive element of claim 4 wherein the condensation polymer is poly[piperazine-co-1,3,3-trimethylcyclohexane-1,5-methylene (25/75) decamethylene-co-1,4,5,8-naphthalenetetracarbonyl-bis(imido-11-undecamethylene)-co-3,4,9,10-perylenetetracarbonyl-bis(imido-11-undecamethylene)-co-octamethylene (25/65/55)]amide.

23. The photoconductive element of claim 4 wherein the condensation polymer is poly[2,2'-(ethylenedioxy)bis(ethylene)-co-piperazine-co-1,3,3-trimethylcyclohexane-1,5-methylene (5/25/70) decamethylene-co-1,4,5,8-naphthalenetetracarbonyl-bis(imido-11-undecamethylene)-co-octamethylene (25/70/5)]amide.

24. The photoconductive element of claim 4 wherein the condensation polymer is Poly[piperazine-co-1,3,3-trimethylcyclohexane-1,5-methylene (25/75) decamethylene-co-1,4,5,8-naphthalenetetracarbonyl-bis(imidoproylene)-co-1,4,5,8-naphthalenetetracarbonyl-bis(imido-11-undecamethylene)-co-octamethylene (25/10/60/5)]amide.

25. The photoconductive element of claim 4 wherein the condensation polymer is poly[2,2'-(ethylenedioxy)bis(ethylene)-co-piperazine-co-1,3,3-trimethylcyclohexane-1,5-methylene (10/25/65) decamethylene-co-1,4,5,8-naphthalenetetracarbonyl-bis(imidopropylene)-co-1,4,5,8-naphthalenetetracarbonyl-bis(imido-11-undecamethylene)-co-octamethylene (25/10/60/5)]amide.

* * * * *